Feb. 21, 1933.   F. J. DIETZ   1,898,037
CONVEYING AND LOADING DEVICE
Filed July 17, 1930   3 Sheets-Sheet 3
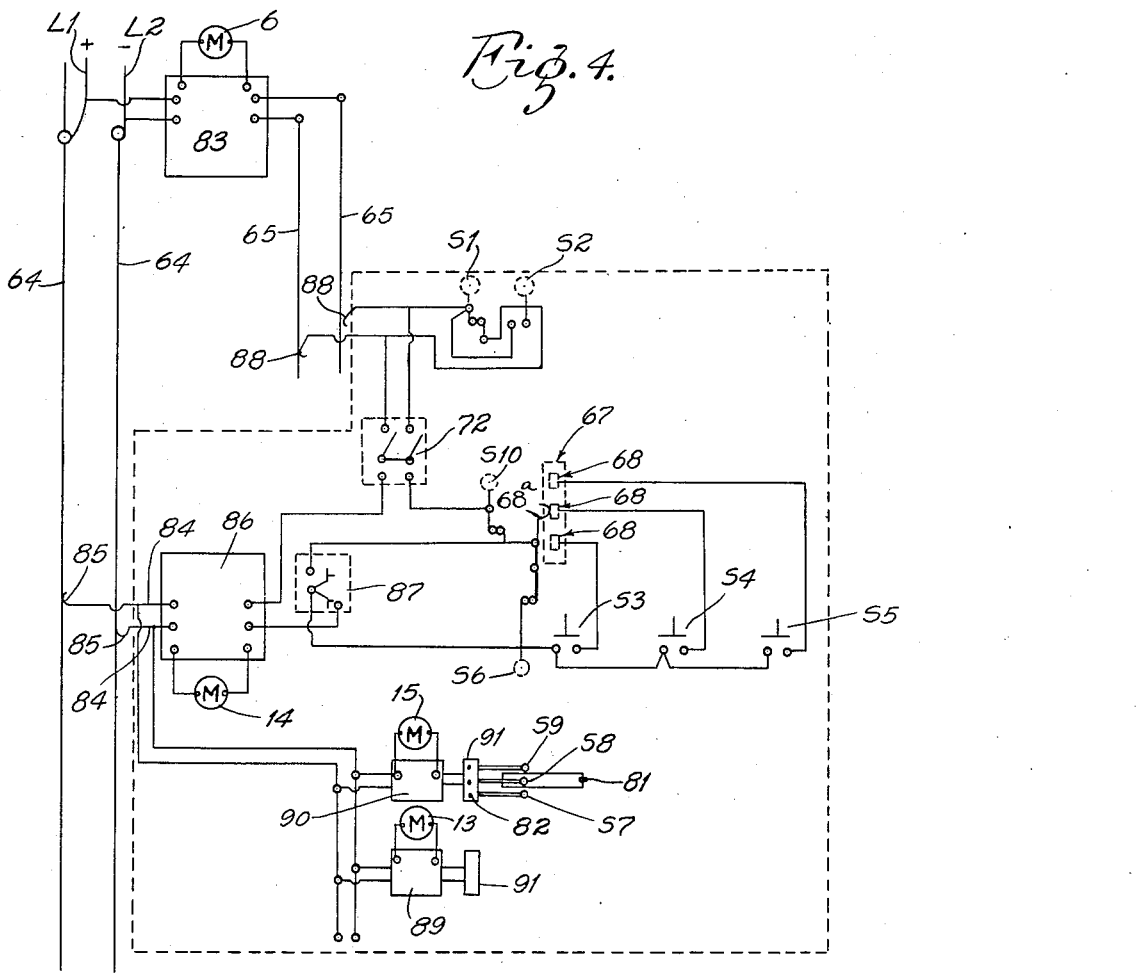
Fig. 4.
Fig. 5.
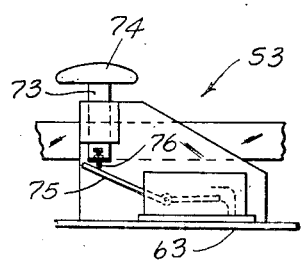
INVENTOR:
Frank J. Dietz
HIS ATTORNEYS.

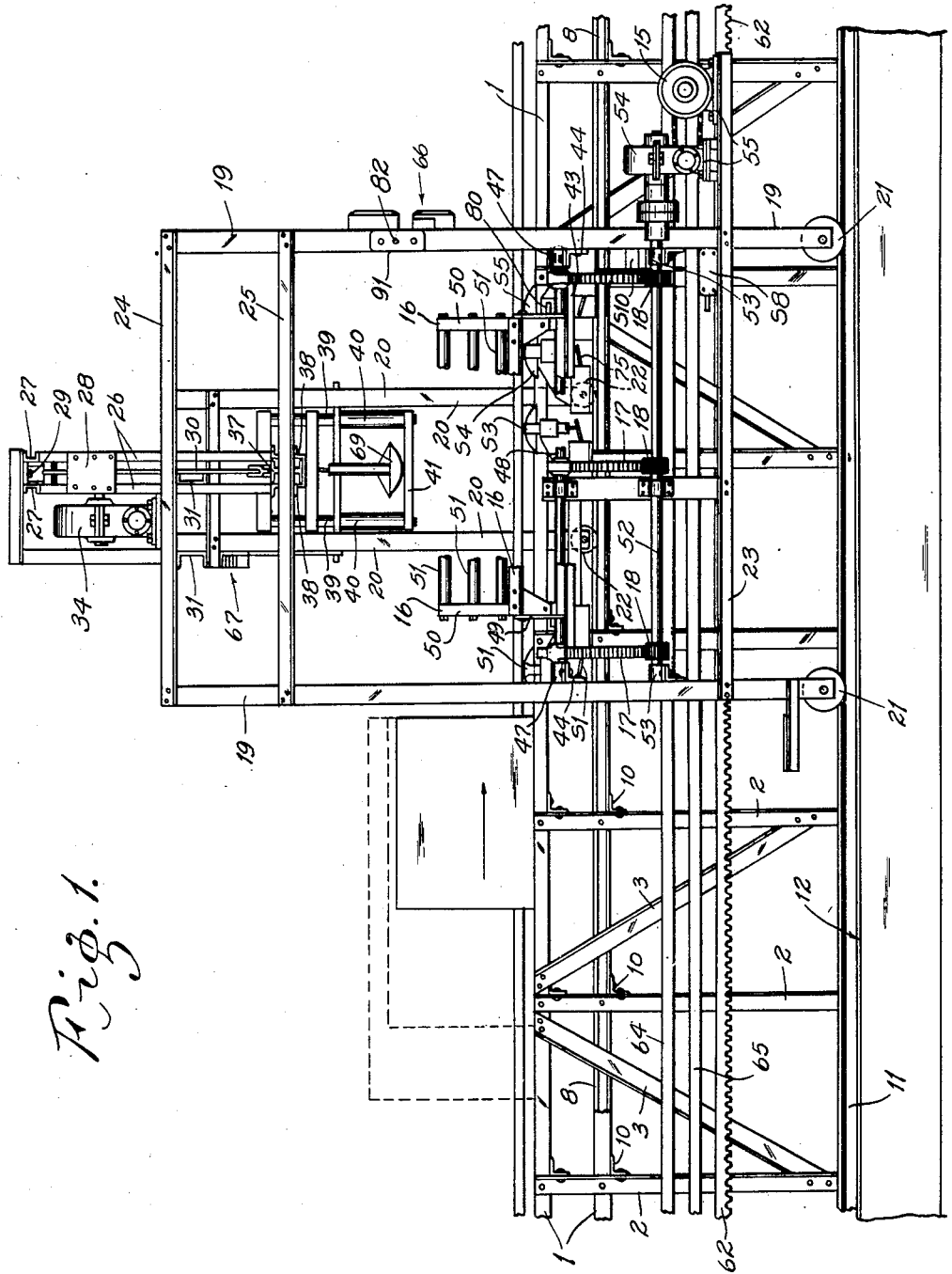

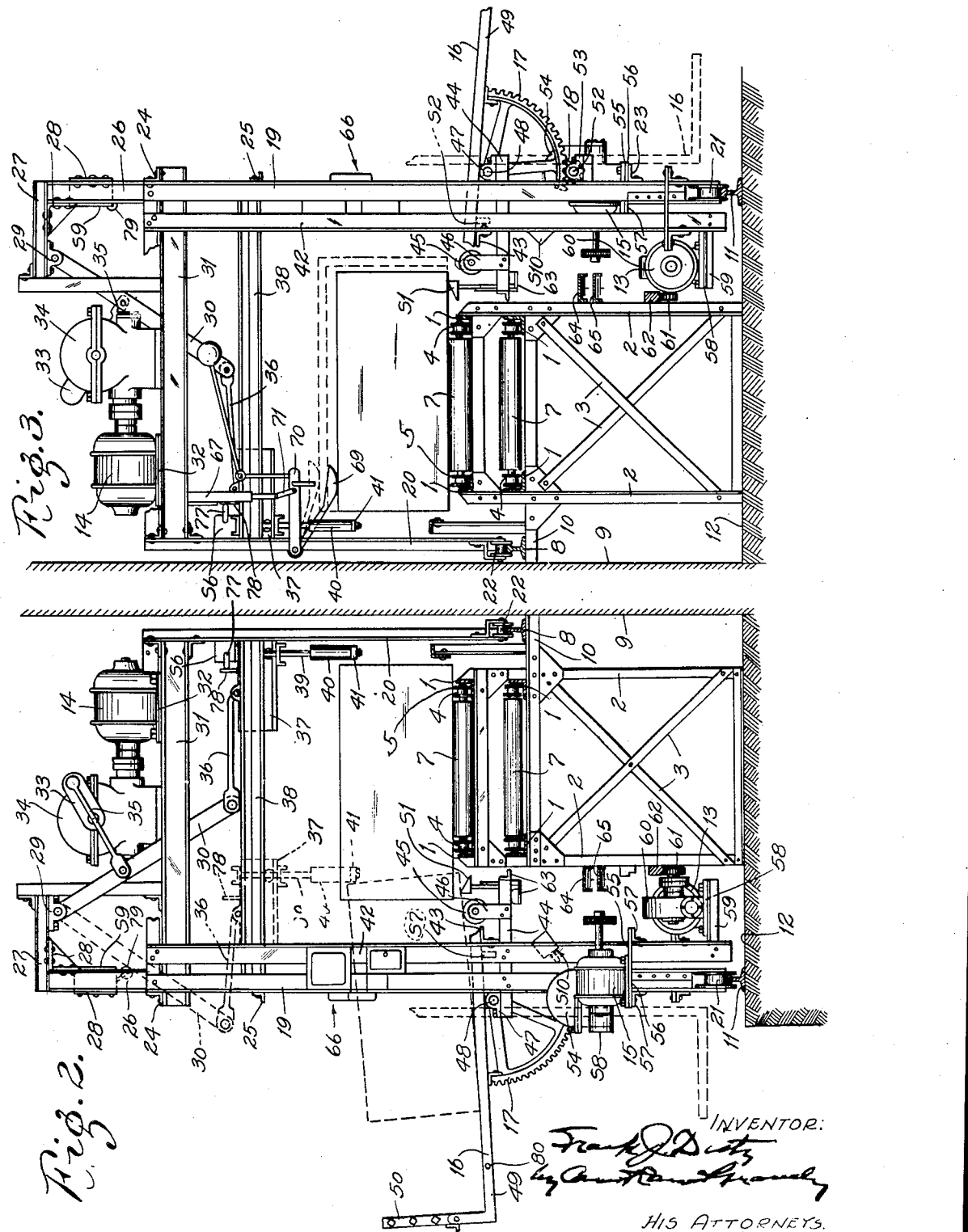

Patented Feb. 21, 1933

1,898,037

UNITED STATES PATENT OFFICE

FRANK J. DIETZ, OF BALTIMORE, MARYLAND, ASSIGNOR TO ALVEY MANUFACTURING COMPANY, OF ST. LOUIS, MISSOURI, A CORPORATION OF MISSOURI

CONVEYING AND LOADING DEVICE

Application filed July 17, 1930. Serial No. 468,507.

My invention relates to a type of loading device wherein articles riding on a moving conveyor may be automatically deflected therefrom, and delivered to a car; and the principal object of this invention is to provide means for accomplishing the same at any point or points along said conveyor. Another object is to automatically deliver the articles to a car in an upended position.

My invention consists in an electrically controlled deflecting and loading device capable of being moved to any position along a moving conveyor, said device being so arranged and constructed with references to cases riding on said conveyor as to be automatically actuated thereby. It also consists in the parts, combinations and arrangements of parts hereinafter described and claimed.

In the accompanying drawings wherein like reference numerals refer to like parts wherever they occur:

Fig. 1 is a front view of a loading device embodying my invention,

Fig. 2 is a forward side view of the loading device,

Fig. 3 is a rear side view thereof,

Fig. 4 is a wiring diagram, and

Fig. 5 is a detail view of one of the switches.

This invention is particularly adapted to be used in conjunction with an apron conveyor or belt conveyor running parallel to a railroad track wherein freight cars standing on said track may be automatically and quickly loaded. In the construction illustrated, the conveyor comprises top and bottom side frames 1 supported by suitable upright members 2 braced by diagonal braces 3 and continuous chains 4 provided with small rollers 5 for engaging said side frames. Said conveyor is driven by a suitable electric motor 6, and the carrying surface of the conveyor comprises rollers 7 rotatably mounted on lateral shafts extending between the chains at regular intervals. A rail 8 for carrying the deflecting device is mounted near wall 9 on suitable cross braces 10 secured to each set of uprights 2, just beneath the lower bed of rollers; whereas another rail 11 running parallel to the rail 8 is mounted on floor 12 a suitable distance from the front of said conveyor.

In general the deflecting device has three operating units driven by electric motors; one motor 13 for shifting said device to a proper point or points along said conveyor, another one 14 for deflecting cases from said conveyor, and a third motor 15 for lowering cases into cars and upending them. The action of motors 14 and 15 are controlled by a number of limit switches so arranged, adapted and constructed as to be automatically actuated by cases being fed to, and deflected by, said device. Assuming the device has been properly positioned in relation to a railroad car, a case upon reaching the center of said device depresses a limit switch, whereby a kick-off mechanism driven by the motor 14 shoves the case at right angles to the conveyor onto a tilting table 16 adapted to receive the same. Another limit switch then automatically energizes the motor 15 and said tilting table is tilted to a vertical position (shown by dotted lines in Fig. 3) by means of quarter circular gear segments 17 engaging pinions 18 operatively connected to the motor 15. The case will then be in an upended position and the device is of such a height in relation to the railroad car that in this position the bottom of said case will be adjacent to, and at the same level as that of the car floor, so that the case may be readily moved into the car. An operator, after positioning the case in said car, then operates a switch whereby the table is raised to its horizontal position, and said device is ready for loading another case, and the above sequence of operations is repeated.

The framework of the device comprises two front upright members 19 and two rear ones 20, the bottom of said front members 19 being provided with flanged wheels 21 for engaging the rail 11 in front of the conveyor, whereas the rear upright members are provided with wheels 22 for running on the rail 8 mounted in the rear of the conveyor framework. The upright members are held together as a framework at the bottom by means of a horizontal brace 23, whereas said members, which extend far enough above the conveyor belt to provide head room for the kick-off mechanism are held together at the top by horizontal members 24. A similar set of horizontal members 25 are located below the top set and help to hold the frame together.

Two vertical channels 26 secured to the top front horizontal braces extend above the top braces and support two horizontal channels 27 which extend toward the rear of the framework and are preferably bracketed by plates 28. Mounted near the end of said members on the underside is a plate 29 upon which the end of a lever 30 is fulcrumed. Two channel shaped members 31 are mounted on one side of said lever and extend between the rear and front horizontal top braces, and a base plate 32 is provided on said members for the motor 14 which drives a crank 33 through a standard type of worm gear speed reducer 34. A pitman 35 connects said crank and the lever 30 whereby said lever will oscillate between the position shown in the drawings in full lines and the position shown in dotted lines (see Fig. 2). The lower movable end of lever 30 is secured to a second connecting member 36 secured to a block 37 slidable in guide members 38 mounted on the front and rear top braces. Extending downward in the rear of said sliding block are two shafts 39 each having a roller 40 slidably mounted thereon and also rotatable thereon for engaging and shoving a case off the conveyor. Secured to the lower ends of each shaft 39 is a cross member 41 to prevent a case from turning around in case it should be shoved by only one of the rollers 40.

Preferably, two vertical angles 42 located near the front upright members on each side of the device, extend between the upper and lower cross braces and a horizontal angle 43 is secured to said angles a slight distance below the top of the conveyor and constitutes an abutment for the tilting table on reaching its horizontal position. Located directly beneath said angle on each side and secured to the front upright guide members are two angles 44 extending from the side of the conveyor framework to a slight distance in front of the front upright members. A suitable roller 45 mounted on supports 46 secured to said angles 44, constitutes a guide for cases being shoved off the conveyor and onto the tilting table and two brackets 47 are provided on the top of said angles 44 and a shaft 48 is mounted on said brackets. Mounted near the end of said shaft, and rotatable therewith, are two side members 49 which form the edges of the tilting table, and the end of said tilting table carries a movable section 50, that may be folded back to clear any cars that might be standing on the track when the loading device is moved from one point to another. Said table, together with the movable end section is provided with suitable rollers 51 to permit cases to be shoved upon said table and easily removed onto the car floor. Also mounted on said shaft 48 near each end and at the center and rotatable therewith, are the quarter circular gear segments 17 that engage said pinion gears 18 mounted on a lower shaft 52, said lower shaft being mounted on brackets 43 provided on the front upright members. The motor 15, through a suitable worm gear speed reducer 54, drives said pinion shaft and constitutes the means for operating the tilting table. Said motor 15 and speed reducer 54 are mounted on a suitable platform 55 on the left side of the deflecting device, said platform comprising a plate 56 of metal or the like mounted upon two horizontal angles 57 secured to the upright frame members. Just below said angles and on the right hand side is another platform 58 mounted on horizontal brackets 59 secured to the front framework which carries the motor 13 for driving, through a suitable gear speed reducer 60, a pinion gear 61 which engages a rack gear 62 secured to, and extending the length of the conveyor framework, and constitutes the means for driving the device along said conveyor. Mounted between the roller 45 and the edge of the conveyor framework, on the angles supporting the tilting table shaft, is a horizontal member 63 extending longitudinally with the conveyor and is provided with a number of limit switches (hereinafter described). Mounted above the rack gear 62 and extending longitudinally of the conveyor are two sets of contact rails; one set 64 which supplies current to the device and termed the service contact rails, and the other set 65 (hereinafter termed the interlock rails) for interconnecting and controlling the conveyor motor 6 and the kickoff motor 14.

The left hand front upright members have mounted thereon a suitable paneling 66 which constitutes a base for emergency control buttons operating the three motors. Having thus described the framework, a complete detail operation of the device will follow which will give the location, and describe the construction of the different limit switches; and for the purpose of clarifying the description, said limit switches will be designated as S1, S2, etc.

While the device may be constructed to deflect one or several varied sizes of cases, the one illustrated in the drawings is designed to handle three different sizes. As each size of case is of a different length and all cases must be diverted from the apron at the center of the loading device, a special electric contacting device 67 is used (hereinafter termed the selector). Said selector 67 comprises three stationary contacts 68, arranged one above the other, and a movable contact member 68a slidable over the stationary contacts. The movable contact member is operated by an arm 69 located with reference to cases riding on the conveyor so as to be engaged thereby. The arm 69 is connected to the movable contact member by suitable connecting members 70 and 71 in such a manner that the movable contact member will be moved upwardly to contact with a particular stationary contact depending on the height of the particular case engaging the arm 69. Each of the contacts is connected in series to a respective limit switch, all of which are mounted on the cross angle 63 and set to start the kick-off device at the proper time for each size of case.

A case to be deflected upon reaching said device, depresses the limit switch S1 of standard design, and normally closed and mounted on the cross angle 63. This switch is connected in parallel with limit switch S2. The switch S2 is mounted below the tilting table and is normally closed when the tilting table is in position to receive a case, and so arranged that the circuit will open when the tilting table has started to descend. Since both switches are connected in parallel with the motor driving the apron, when the tilting table is down and a case has depressed limit switch S1, the apron will stop running. Thus if a case should reach the deflecting device at a time when the tilting table is not in a position to receive the same, upon depressing the limit switch S1, said case will automatically cause the roller bed apron to cease moving until the tilting table has arrived to its normal receiving position and closed switch S2. If a case is to be passed through said device and not deflected therefrom, a double throw switch 72 located on the emergency control panel may be operated by a press button, the action of said switch, which is connected in parallel with the kick-off limit switches S1 and S2 by-passing the apron motor control circuit and opening the kick-off mechanism circuit and the case will not affect the kick-off mechanism and pass thereby.

Assuming that the case is to be diverted and said tilting table is in its receiving position, the case passes on, lifting the selector arm 69, whose action makes the contact, or selects one of the limit switches S3, S4 and S5 according to the height of the case.

It is obvious in this connection that the lowest case which is also the shortest, sets the selector contact for limit switch S3; whereas the next size case will select the contact for limit switch S4, and the highest case selecting the limit switch S5. These three last mentioned limit switches and switch S1 are of common design and each is operated by a similar arm 73 extending a slight distance above the top of the conveyor apron and provided with a hood 74 so that the bottom of a case will contact with the top rounded portion adapted to operate the switch arm, thereby causing a plunger arm 75 operatively connected to the limit switches to actuate the same. It is obvious in this connection that the plunger arms 75 of each switch are brought back to their normal position by a spring which is provided in each standard limit switch. Preferably a set screw 76 is provided at the bottom of each arm 73 for adjusting each switch.

When the case has set the selector, it passes on until it reaches the center of the loading device depressing either limit switch S3, S4 or S5 depending on the size of the case, and the kick-off motor is energized whereby the case is shoved onto the tilting table. However, as soon as the kick-off mechanism is started on its outward stroke, limit switch S6, located upon the rear framework is closed, which by-passes said switches S3, S4, S5, and the kick-off motor continues to run until a cycle is completed and the kick-off mechanism has returned to its normal position for receiving another case. It is obvious, that if this switch were omitted, as soon as the case was diverted onto the tilting table, the kick-off motor would stop, leaving the diverting rollers projecting over the apron and blocking the passage of the next case. Said switch S6 is operated by an arm 77 which engages a lug 78 on the sliding block 37. Preferably the starter for the kick-off motor is provided with a brake to prevent drifting of the kick-off mechanism after the limit switch opens at the end of the returning stroke.

When the arms have reached the end of the outward stroke and the case is positioned on the tilting table, limit switch S9, positioned on the kick-off lever support, is closed by the action of the kick-off lever striking an actuating lever 79 extending from said switch and S9 is closed by the kick-off lever and the motor starts to operate the tilting table on its downward movement. Said case is then lowered and upended (shown by dotted lines) whereby an operator may easily place the same in the car.

Upon the closing of switch S9 said table lowers until it opens switch S8 by the action of a lug 80 on the end of the tilting table striking the actuating lever of said switch, and the motor 15 is thereby stopped. The table is then raised by pressing a start button 81, hung on a cable inside the car, said start button being the only button normally handled by the operator and so planned in order to avoid an accident as the operator will be responsible for sufficient clearance for table movement. Should there be an obstruction, the table is preferably stopped during any portion of the movement by a stop button 82 located on the emergency control panel.

When the roller apron is stopped by the normal action of a case, it is possible that a following case, might be crowded into the loading machine which would start the kick-off mechanism and create a dangerous condition. To prevent this limit switch S10, which is normally closed and located on the front framework will open the circuit of the kick-off mechanism, when the kick-off mechanism has completed its operating cycle, said switch S10 being operated by one of the gear segments 17 engaging its actuating lever. Switch S10 is closed again when tilting table ascends to its up or receiving position.

In order to open the tilting table motor circuit, when the tilting table arrives at its receiving position, limit switch S7 mounted on the angle 44 is actuated by the side frame of said tilting table.

Referring to the diagrammatic wiring system, power lines L1 and L2 are connected to the ends of the service contact rails 64 and also to a control box 83 for the conveyor motor 6 which is located at the forward end of the conveyor frame work. The switch terminals of said box are connected to the ends of the interlocked contact rails 65 which run parallel with the service rails along the conveyor frame work.

The three motors mounted on the loading device (shown by dotted lines) are all supplied with current from two main leads 84 extending from the frame work of the device and are provided with brushes 85 for contact with the service rails 64. A control box 86, which is of standard design and provided with a dynamic brake relay, for the kick-off motor 14 contains in its controlling circuit the three limit switches S3, S4 and S5 (all normally open) each of which is connected in series with its cooperating selector contact point 68, whereas the three switches and the corresponding selector contacts themselves, are connected in parallel, whereby any of the switches will close that portion of the circuit independently of any other. Also connected in parallel with the above mentioned switches is the limit switch S6 (normally closed) which is operated by the kick-off lever and which will also close the circuit independently of the others, to complete the kick-off cycle.

For emergency purposes, a standard push button station 87 provided with a start and stop button is inserted in the circuit between the previously mentioned switches and the control box, and connected in series therewith is the limit switch S10 (normally closed) for opening the kick-off circuit when the kick-off mechanism has completed its operating cycle, and the double throw switch 72 for by-passing a case through the machine. Said switch 72 is connected in the conveyor motor circuit in parallel with the limit switch S1 (normally closed) and the limit switch S2 (normally opened), and said circuit controls the apron drive motor 6 through brushes 88 engaging the interlocked rails 65. The double throw switch 72 is so constructed and arranged so as to close one circuit and open the other, and it is obvious that by closing the conveyor motor circuit, the kick-off motor will cease running and the apron conveyor will carry a case on through the loading device, without deflecting it.

Preferably, the control boxes 89 and 90 which are of standard design for both the motor 13 and the tilting table motor 15 are supplied with current through wires connected to the main leads. Operated and connected to both control boxes 89 and 90 are standard push button stations 91 having buttons for starting, stopping and reversing the motors. Hooked up respectively with the starting, stopping and reversing buttons of the motor 15 are the limit switches S7, (normally closed) for completing the upward movement of the tilting table, S8 (normally closed) for completing the downward movement of the table and S9 (normally opened) to start the downward movement of said table.

What I claim is:

1. A conveying and loading device comprising a conveyor, a framework associated therewith, means for moving said framework along said conveyor, shifting means provided on said framework for shifting an article from said conveyor, a tilting platform adapted to receive an article shifted from said conveyor, and means under the control of said shifting means for tilting said platform.

2. A conveying and loading device comprising a conveyor, a framework associated therewith, a mechanism mounted on said framework for shifting an article off of said conveyor, power means under the control of an article for operating said mechanism, a tilting table in position to receive an article shifted from said conveyor, and means under the control of said mechanism for tilting said table.

3. A conveying and loading device comprising a conveyor, a framework associated therewith, movable arms mounted on said framework and positioned in relation to articles riding on said conveyor for shoving articles off of said conveyor, a motor operatively connected to said arms, a tilting table normally in horizontal position for receiving an article shoved from said conveyor, and a second motor under the control of the other motor for tilting said table whereby the center of gravity of said article is changed to a different level.

4. A conveying and loading device comprising a conveyor, a framework associated therewith, movable arms mounted on said framework and positioned in relation to articles riding on said conveyor for shoving articles off of said conveyor while said conveyor is in motion, a motor under the control of an article on said conveyor for operating said arms, a tilting table normally in horizontal position for receiving an article shoved from said conveyor, and a second motor under the control of the other motor for moving the titling table to a vertical position whereby said article is lowered and upended.

5. A conveying and loading device comprising a conveyor, a framework straddling said conveyor, a rack gear mounted along said conveyor, a pinion gear engaging said rack gear, a motor mounted on said framework and operatively connected with said pinion gear, means provided on said framework for shifting an article from said conveyor, a tilting table adapted to receive an article shifted therefrom, and means under the control of said shifting means for tilting said table.

6. A conveying and loading device comprising a conveyor, a framework associated therewith, shifting means provided on said framework for shifting an article from said conveyor, selective control means responsive only to articles of different sizes, respectively, for controlling said shifting means, a tilting table adapted to receive an article shifted therefrom, and means under the control of said shifting means for tilting said table.

7. A conveying and loading device comprising a conveyor, a framework associated therewith, means provided on said framework for shifting an article from said conveyor, a shaft mounted on said framework, a platform adapted to receive an article shifted from said conveyor pivoted on said shaft, gear segments rigidly mounted on said shaft, a second shaft mounted on said framework, pinions mounted on said shaft engaging the gear segments and a motor operatively connected with said shaft, said motor being automatically started by said shifting means.

8. A conveying and loading device comprising a conveyor, a motor operatively connected with said conveyor for operating the same, a framework associated with said conveyor, means provided on said framework for shifting an article from said conveyor, a tilting table adapted to receive an article shifted therefrom, means for tilting said table, and means under the conjoint control of said tilting means and an article riding on said conveyor for controlling said motor.

9. A conveying and loading device comprising a conveyor, a motor operatively connected with said conveyor for operating the same, a framework associated with said conveyor, means provided on said framework for shifting an article from said conveyor, a tilting table adapted to receive an article shifted therefrom, means for tilting said table, means for controlling said motor comprising a limit switch in position to be actuated by a case riding on said conveyor, a second limit switch in position to be actuated by said tilting table, said limit switches being connected in parallel with the motor operating the conveyor.

10. A conveying and loading device comprising a conveyor, a framework associated therewith, shifting means provided on said framework for shifting an article from said conveyor, a motor for operating said shifting means and having a control circuit, a platform adapted to receive an article shifted therefrom, means for tilting said platform, and means controlling said motor comprising a limit switch in position to be actuated by articles riding on said conveyor inserted in the control circuit for starting said motor, a second limit switch connected in parallel with the first mentioned limit switch and actuated by said shifting means for keeping said motor running, and a third limit switch connected in series between the other switches and the motor for opening the control circuit when the tilting platform is not in position to receive an article, said limit switch being actuated by said tilting platform.

11. A conveying and loading device comprising a conveyor, a framework associated therewith, shifting means provided on said framework for shifting an article from said conveyor, a motor for operating said shifting means and having a control circuit, a platform adapted to receive an article shoved therefrom, means for tilting said platform, and means controlling said motor comprising an arm for bridging a plurality of gaps in the control circuit of said motor, each gap being arranged in series with a limit switch for selecting the same, said arm and said limit switches being in position to be actuated by articles riding on said conveyor, another limit switch connected in parallel with the first mentioned limit switches between them and the motor and actuated by said shifting means for keeping said motor running and another limit switch connected in series between the other switches and the motor for opening the control circuit when the tilting platform is not in position to receive an article, said limit switch being actuated by said tilting platform.

12. A conveying and loading device comprising a conveyor, a framework associated therewith, means provided on said framework for shoving an article off of said conveyor, a tilting table adapted to receive an article shoved therefrom, means for tilting said table, means for controlling said tilting means comprising a limit switch operated by said shifting means for starting the downward movement of said table, a second limit switch operated by said tilting means for stopping the downward movement of said tilting table, a third limit switch operated by said tilting means for stopping the upward movement of said tilting table, and a press-button switch manually operated for starting said tilting table on its upward movement.

13. A conveying and loading device comprising a conveyor, means for operating said conveyor, a framework which is movable along said conveyor, means provided on said framework for shifting an article therefrom, a tilting table adapted to receive an article shifted therefrom, means for tilting said table, contact rails operatively connected to said conveyor operating means and extending along said conveyor, and means provided on said movable framework and connected to said contact rails for controlling said conveyor operating means.

14. In a conveying and loading system, a conveyor, a motor for driving said conveyor, a control box for controlling said motor, a framework associated with said conveyor, means on said framework for shifting an article from said conveyor, a second motor for operating said shifting means, a circuit containing a second control box for controlling said second motor, means for receiving an article shifted from said conveyor, a limit switch actuated by an article on said conveyor and connected to the control terminals of the first control box, a second limit switch actuated by said receiving means and connected in parallel with said first mentioned switch, a manually operated double throw switch having one set of its terminals connected in parallel with said limit switches and its other set of terminals connected in the circuit containing the second control box, a plurality of limit switches in said circuit and actuated by articles on said conveyor, a device actuated by articles on said conveyor for selecting one of said plurality of switches, said device being connected in said circuit in series with said plurality of switches, another limit switch actuated by said shifting means and connected in said circuit in parallel with the plurality of limit switches between them and said second control box, and another limit switch actuated by said receiving means and connected in said circuit in series with the terminals of the double throw switch, said double throw switch being located in said circuit between the selecting device and the second control box.

15. A conveying and loading device comprising a conveyor, a frame work associated therewith, shifting means movable across said frame work and operating on a forward and return stroke for shifting an article from said conveyor and means controlling said shifting means comprising a limit switch in position to be actuated by an article riding on said conveyor and a second limit switch connected in parallel with said first mentioned limit switch in position to be closed at the start of the forward stroke of said movable means and opened at the end of the return stroke thereof.

16. A conveying and loading device comprising a conveyor, a frame work associated therewith, shifting means provided on said frame work, a plurality of limit switches located along said frame work for actuating said shifting means, each of said limit switches being in position to be actuated by articles riding on said conveyor and means provided on said frame work and actuated by an article on said conveyor before reaching said limit switches for selecting a particular limit switch depending upon the size of said article.

17. A conveying and loading device comprising a conveyor, a frame work associated therewith, shifting means provided on said frame work for shifting an article from said conveyor, a motor for operating said shifting means and having a control circuit, means controlling said motor comprising limit switches, an arm for bridging a plurality of gaps in the control circuit of said motor, each gap being arranged in series with a limit switch for selecting the same, and said arm and said limit switches being in position to be actuated by articles riding on said conveyor.

Signed at Brooklyn, N. Y., this 8th day of July, 1930.

FRANK J. DIETZ.